Dec. 15, 1964 P. SPIEGEL 3,161,781
ANTI-COINCIDENCE CIRCUIT USING TUNNEL DIODES
Filed Jan. 30, 1961

INVENTOR.
PHILIP SPIEGEL
BY
Fordyce A. Bothwell
ATTORNEY

3,161,781
ANTI-COINCIDENCE CIRCUIT USING TUNNEL DIODES

Philip Spiegel, Philadelphia, Pa., assignor, by mesne assignments, to Philco Corporation, Philadelphia, Pa., a corporation of Delaware Filed Jan. 30, 1961, Ser. No. 85,857
15 Claims. (Cl. 307—88.5)

This invention relates to anti-coincidence circuits, which are also known as "exclusively-or" circuits and as "and-not" circuits. Such a circuit has two input terminals and an output terminal, and it functions to produce an output pulse at its output terminal only when an input pulse is applied to one of its input terminals and no input pulse is applied to the other input terminal.

Prior circuits of this type have employed either vacuum tubes or transistors. Such circuits have not been entirely satisfactory, mainly because they are inherently incapable of extremely high speed operation which is desirable in many instances.

The principal object of the present invention is to provide an improved anti-coincidence circuit which is capable of operating at very high speed and which therefore overcomes the main objection of prior circuits of this type.

Another object of this invention is to provide an improved anti-coincidence circuit which is substantially immune to environmental influences and which lends itself to microminiaturization.

Other objects and features of the invention will be apparent as the description proceeds.

In accordance with this invention, an anti-coincidence circuit is provided which comprises a novel combination of two tunnel diode threshold circuits connected for opposite polarity input pulses and an adder arrangement of the type known as a Kirchoff adder. This anti-coincidence circuit produces an output pulse of the same polarity as an input pulse applied to one of its input terminals when no input pulse is applied to the other input terminal. Provision is made for resetting each tunnel diode threshold circuit. In one embodiment the anti-coincidence circuit will produce an output pulse in response to an input pulse applied to either of its input terminals when no input pulse is applied to its other input terminal. In another embodiment the anti-coincidence circuit will produce an output pulse only in response to an input pulse applied to a particular one of its input terminals when no input pulse is applied to the other input terminal.

The invention may be fully understood from the following detailed description with reference to the accompanying drawing wherein FIG. 1 is a diagrammatic illustration of an anti-coincidence circuit according to one embodiment of the invention;

Figure 1:
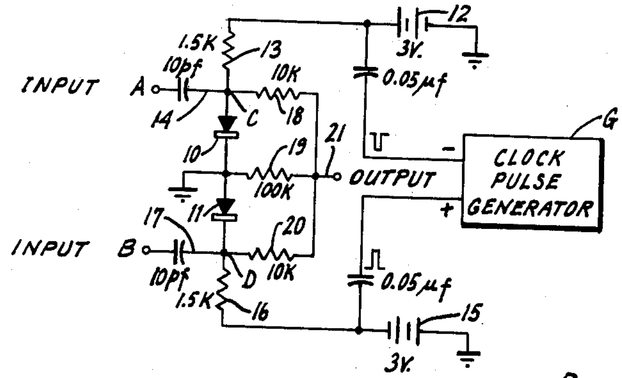

Referring first to FIG. 1, in the circuit there shown there are first and second tunnel diodes 10 and 11. The cathode of the first diode 10 and the anode of the second diode 11 are connected together and to a point of reference potential. A first source 12 of unidirectional voltage has its negative terminal connected to said point of reference potential, and a first resistor 13 is connected between the positive terminal of said source and the anode of the first diode 10, so that the latter is normally forward biased. A first input connection 14 is connected to the junction of resistor 13 and the anode of diode 10. A second source 15 of the unidirectional voltage has its positive terminal connected to said point of reference potential, and a second resistor 16 is connected between the negative terminal of source 15 and the cathode of diode 11, so that the latter is normally forward biased. A second input connection 17 is connected to the junction of resistor 16 and the cathode of diode 11. Three resistors 18, 19 and 20 are connected respectively between the anode of diode 10 and an output connection 21, between the point of reference potential and said output connection, and between the cathode of diode 11 and said output connection. A conventional clock pulse generator G supplies negative and positive pulses respectively to the diode circuits for reset as described below.

It will be seen that the anti-coincidence circuit shown comprises two tunnel diode threshold circuits connected for input pulses of opposite polarity, and a Kirchoff adder comprising resistors 18 to 20. The first tunnel diode 10 is biased so that point C is normally at a predetermined positive potential, while the second tunnel diode 11 is biased so that point D is normally at a predetermined negative potential.

Figure 2:
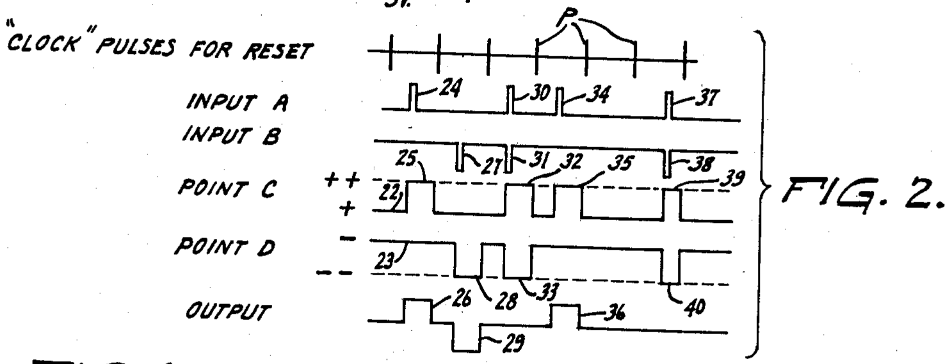
FIG. 2 is a waveform illustration which will facilitate a clear understanding of the invention.

The operation of the circuit can be better understood with the aid of FIG. 2. By way of example, with germanium tunnel diodes and with the circuit parameters indicated, point C is normally biased to the positive potential level 22, e.g. +40 mv., while point D is normally biased to the negative potential level 23, e.g. −40 mv. The voltages at points C and D cancel in the adder so that normally there is no output. Suppose now that input A comprises positive pulses and input B comprises negative pulses as shown. The equally time-spaced clock pulses P determine the interval of time during which an anti-coincidence decision may be made. Only one pulse may be applied to each input during each time interval between clock pulses. The tunnel diodes 10 and 11 are reverse biased by the concurrent negative and positive clock pulses to effect reset.

Positive pulse 24 switches diode 10 and causes the voltage at point C to rise to the higher positive level 25, e.g. +400 mv. Since there is no opposing pulse at input B, a positive output pulse 26 is produced. The next negative clock pulse causes the voltage at point C to return to its normal level 22 and thus terminates the output pulse.

Negative pulse 27 switches diode 11 and causes the negative voltage at point D to increase to level 28, e.g. −400 mv., and since there is no opposing pulse at input A, a negative output pulse 29 is produced. The next positive clock pulse causes the voltage at point D to return to its normal level 23 and thus terminates the output pulse.

Pulses 30 and 31 switch both diodes and the voltage pulses 32 and 33 at points C and D cancel one another so that no output is produced. The next negative and positive clock pulses reset the diodes.

Positive pulse 34 switches diode 10 and causes the voltage rise 35 at point C, and since there is no opposing pulse at input B, a positive output pulse 36 is produced. The next negative clock pulse resets diode 10 and terminates the output pulse.

Pulses 37 and 38 switch both diodes, and the voltages 39 and 40 at points C and D cancel one another so that no output pulse is produced. The next negative and positive clock pulses reset the diodes.

Thus it will be seen that in operation of the embodiment of FIG. 1, a positive output pulse indicates an input pulse at input A alone, while a negative output pulse indicates an input pulse at input B alone.

Figure 3:
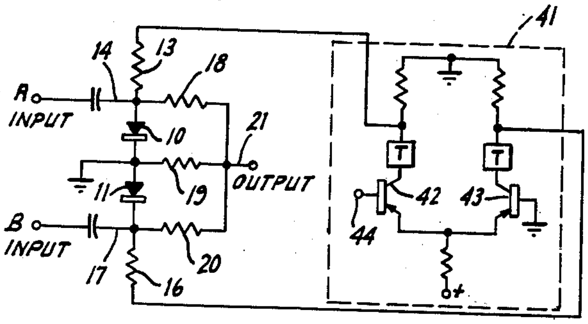
FIG. 3 shows the circuit of FIG. 1 with an alternative clocking arrangement.

An alternative arrangement for clocking at high frequencies is shown in FIG. 3. In this instance the operating and reset voltages are supplied by a known current switching arrangement within the broken line block 41. This arrangement comprises current switching transistors 42 and 43 and voltage translators T which employ Zener diodes. This type of current switching arrangement is disclosed, for example, in the article by Yourke entitled "Millimicrosecond Current Switching Circuits," I.R.E. Transactions on Circuit Theory, vol. CT-4, No. 3, September 1957, pp. 236–240. This switching arrangement operates cyclically in response to a sine or square wave input at terminal 44. During one half of each cycle +3 volts and −3 volts are applied as from the sources 12 and 15 in FIG. 1. The tunnel diodes 10 and 11 are forward biased at this time and an anticoincidence decision is possible. During the next half cycle, when the transistors 42 and 43 switch, the applied voltages are reversed and the tunnel diodes are reverse biased to effect reset.

Figure 4:
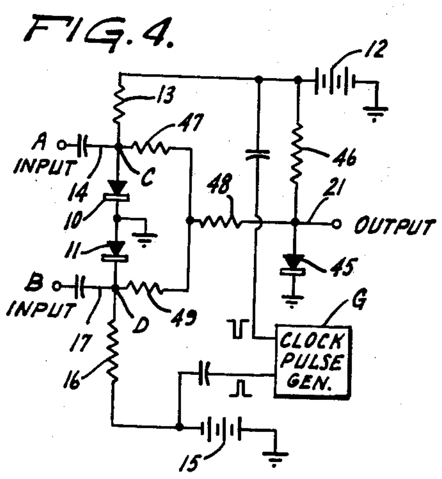
FIG. 4 is a diagrammatic illustration of an anti-coincidence circuit according to another embodiment of the invention.

Referring now to FIG. 4, the circuit there shown is adapted to produce an output pulse only when there is an input pulse at input A and no input pulse at input B. This circuit is similar to that of FIG. 1 except for the adding circuit. Thus in FIG. 4 elements 10 to 17 and 21 correspond to the similarly designated elements of FIG. 1. In FIG. 4, however, a third tunnel diode 45 has its anode connected to the output connection 21 and its cathode connected to the point of reference potential, and a resistor 46 is connected between the positive terminal of source 12 and the anode of diode 45, thus providing a third tunnel diode threshold circuit. Resistors 47 and 48 are serially connected between the anode of diode 10 and the anode of diode 45, and resistor 49 is connected between the cathode of diode 11 and the junction of resistors 47 and 48. The clock pulses from generator G serve to reverse bias all three tunnel diodes to effect reset.

The operation of the circuit of FIG. 4 is the same as the operation of the circuit of FIG. 1 as described above except that an output pulse is produced only in response to a positive input pulse at input A when there is no input pulse at input B, the output pulse being positive. The output pulse is produced by reason of the fact that the increased positive potential at point C is applied to the anode of tunnel diode 45 and switches the latter diode. When there is a negative input pulse at input B and no input pulse at input A, the increased negative potential at point D is incapable of switching diode 45 and therefore there is no output. When there are input pulses at both inputs A and B, the voltages at points C and D cancel one another and there is no output.

Figure 5:
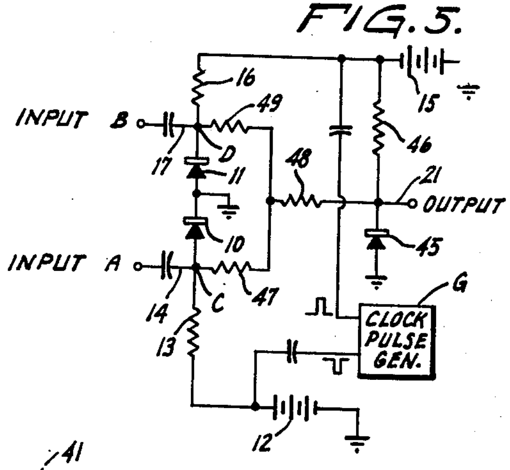
FIG. 5 is a diagrammatic illustration of an anti-coincidence circuit according to still another embodiment of the invention.

Referring now to FIG. 5, the circuit there shown is similar to that of FIG. 4 except that the elements are reversed so that an output pulse is produced only in response to a negative input pulse at input B when there is no input pulse at input A, the output pulse being negative. The output pulse is produced by reason of the fact that the increased negative potential at point D is applied to the cathode of tunnel diode 45 and switches the latter diode. When there is a positive input pulse at input A and no input pulse at input B, the increased positive potential at point C is incapable of switching diode 45, and there is no output. When there are input pulses at both inputs A and B, the voltage at points C and D cancel one another and there is no output.

While the invention has been described with reference to certain illustrated embodiments, it will be understood that the invention is not limited thereto but contemplates such modifications and further embodiments as may occur to those skilled in the art.

I claim:

1. An anti-coincidence circuit comprising first and second tunnel diodes, means connecting the cathode of the first diode and the anode of the second diode together and to a point of reference potential, means for biasing the anode of said first diode to a predetermined positive potential, a first input connection connected to the anode of said first diode for application of positive pulses, means for biasing the cathode of said second diode to a predetermined negative potential, a second input connection connected to the cathode of said second diode for applicaton of negative pulses, an output connection, and means connected between said output connection and said diodes for producing an output pulse at said output connection only when an input pulse is applied to one of said input connections and no input pulse is applied to the other input connection.

2. An anti-coincidence circuit according to claim 1, wherein said last-named means is constructed to produce and output pulse when an input pulse is applied to either of said input connections.

3. An anti-coincidence circuit according to claim 1, wherein said last-named means is constructed to produce an output pulse only when an input pulse is applied to said first input connection.

4. An anti-coincidence circuit according to claim 1, wherein said last-named means is constructed to produce an output pulse only when an input pulse is applied to said second input connection.

5. An anti-coincidence circuit comprising first and second tunnel diodes, means connecting the cathode of the first diode and the anode of the second diode together and to a point of reference potential, means for biasing the anode of said first diode to a predetermined positive potential, a first input connection connected to the anode of said first diode for application of positive pulses, means for biasing the cathode of said second diode to a predetermined negative potential, a second input connection connected to the cathode of said second diode for application of negative pulses, an output connection, and means for producing an output pulse at said output connection only when an input pulse is applied to one of said input connections and no input pulse is applied to the other input connection, said last-named means comprising three resistors connected respectively between the anode of said first diode and said output connection, between said point of reference potential and said output connection, and between the cathode of said second diode and said output connection.

6. An anti-coincidence circuit comprising first and second tunnel diodes, means connecting the cathode of the first diode and the anode of the second diode together and to a point of reference potential, means for biasing the anode of said first diode to a predetermined positive potential, a first input connection connected to the anode of said first diode for application of positive pulses, means for biasing the cathode of said second diode to a predetermined negative potential, a second input connection connected to the cathode of said second diode for application of negative pulses, an output connection, and means for producing an output pulse at said output connection only when an input pulse is applied to said first input connection and no input pulse is applied to said second input connection, said last-named means comprising a third tunnel diode having its anode connected to said output connection and its cathode connected to said point of reference potential, means for biasing the anode of said third diode to a predetermined positive potential, two resistors serially connected between the anode of said first diode and the anode of said third diode, and another resistor connected between the cathode of said second diode and the junction of said two resistors.

7. A anti-coincidence circuit comprising first and second tunnel diodes, means connecting the cathode of the first diode and the anode of the second diode together and to a point of reference potential, means for biasing the anode of said first diode to a predetermined positive potential, a first input connection connected to the anode of said first diode for application of positive pulses, means for biasing the cathode of said second diode to a predetermined negative potential, a second input connection connected to the cathode of said second diode for application of negative pulses, an output connection, and means for producing an output pulse at said output connection only when an input pulse is applied to said second input connection and no input pulse is applied to said first input connection, said last-named means comprising a third tunnel diode having its cathode connected to said output connection and its anode connected to said point of reference potential, means for biasing the cathode of said third diode to a predetermined negative potential, two resistors serially connected between the cathode of said second diode and the cathode of said third resistor, and another resistor connected between the anode of said first diode and the junction of said two resistors.

8. An anti-coincidence circuit comprising first and second tunnel diodes, means connecting the cathode of the first diode and the anode of the second diode together and to a point of reference potential, a first source of unidirectional voltage having its negative terminal connected to said point of reference potential, a first resistor connected between the positive terminal of said source and the anode of said first diode, a first input connection connected to the junction of said resistor and the anode of said first diode for application of positive pulses to said junction, a second source of unidirectional voltage having its positive terminal connected to said point of reference potential, a second resistor connected between the negative terminal of said second source and the cathode of said second diode, a second input connection connected to the junction of said said second resistor and the cathode of said second diode for application of negative pulses to the latter junction, an output connection, and means connected between said output connection and said diodes for producing an output pulse at said output connection only when an input pulse is applied to one of said input connections and no input pulse is applied to the other input connection.

9. An anti-coincidence circuit according to claim 8, wherein said last-named means is constructed to produce an output pulse when an input pulse is applied to either of said input connections.

10. An anti-coincidence circuit according to claim 8, wherein said last-named means is constructed to produce an output pulse only when an input pulse is applied to said first input connection.

11. An anti-coincidence circuit according to claim 8, wherein said last-named means is constructed to produce an output pulse only when an input pulse is applied to said second input connection.

12. An anti-coincidence circuit comprising first and second tunnel diodes, means connecting the cathode of the first diode and the anode of the second diode together and to a point of reference potential, a first source of unidirectional voltage having its negative terminal connected to said point of reference potential, a first resistor connected between the positive terminal of said source and the anode of said first diode, a first input connection connected to the junction of said resistor and the anode of said first diode for application of positive pulses to said junction, a second source of unidirectional voltage having its positive terminal connected to said point of reference potential, a second resistor connected between the negative terminal of said second source and the cathode of said second diode, a second input connection connected to the junction of said second resistor and the cathode of said second diode for application of negative pulses to the latter junction, an output connection, and means for producing an output pulse at said output connection only when an input pulse is applied to one of said input connections and no input pulse is applied to the other input connection, said last-named means comprising three resistors connected respectively between the anode of said first diode and said output connection, between said point of reference potential and said output connection, and between the cathode of said second diode and said output connection.

13. An anti-coincidence circuit comprising first and second tunnel diodes, means connecting the cathode of the first diode and the anode of the second diode together and to a point of reference potential, a first source of unidirectional voltage having its negative terminal connected to said point of reference potential, a first resistor connected between the positive terminal of said source and the anode of said first diode, a first input connection connected to the junction of said resistor and the anode of said first diode for application of positive pulses to said junction, a second source of unidirectional voltage having its positive terminal connected to said point of reference potential, a second resistor connected between the negative terminal of said second source and the cathode of said second diode, a second input connection connected to the junction of said second resistor and the cathode of said second diode for application of negative pulses to the latter junction, an output connection, and means for producing an output pulse at said output connection only when an input pulse is applied to said first input connection and no input pulse is applied to said second input connection, said last-named means comprising a third tunnel diode having its anode connected to said output connection and its cathode connected to said point of reference potential, a third resistor connected between the positive terminal of said first source and the anode of said third diode, two resistors serially connected between the anode of said first diode and the anode of said third diode, and another resistor connected between the cathode of said second diode and the junction of said two resistors.

14. An anti-coincidence circuit comprising first and second tunnel diodes, means connecting the cathode of the first diode and the anode of the second diode together and to a point of reference potential, a first source of unidirectional voltage having its negative terminal connected to said point of reference potential, a first resistor connected between the positive terminal of said source and the anode of said first diode, a first input connection connected to the junction of said resistor and the anode of said first diode for application of positive pulses to said junction, a second source of unidirectional voltage having its positive terminal connected to said point of reference potential, a second resistor connected between the negative terminal of said second source and the cathode of said second diode, a second input connection connected to the junction of said second resistor and the cathode of said second diode for application of negative pulses to the latter junction, an output connection, and means for producing an output pulse at said output connection only when an input pulse is applied to said second input connection and no input pulse is applied to said first input connection, said last- named means comprising a third tunnel diode having its cathode connected to said output connection and its anode connected to said point of reference potential, a third resistor connected between the negative terminal of said second source and the cathode of said third diode, two resistors serially connected between the cathode of said second diode and the cathode of said third diode, and another resistor connected between the anode of said first diode and the junction of said two resistors.

15. An anti-coincidence circuit comprising first and second tunnel diodes, means connecting the cathode of the first diode and the anode of the second diode together and to a point of reference potential, means for biasing the anode of said first diode to a predetermined positive potential, a first input connection connected to the anode of said first diode for application of positive pulses, means for biasing the cathode of said second diode to a predetermined negative potential, a second input connection connected to the cathode of said second diode for application of negative pulses, a common output connection, a pair of resistors connected respectively between the anode of said first diode and said output connection and between the cathode of said second diode and said output connection, and output impedance means connected between said output connection and said point of reference potential.

References Cited in the file of this patent

UNITED STATES PATENTS

| | | |
|---|---|---|
| 2,614,140 | Kreer | Oct. 14, 1952 |
| 2,966,599 | Haas | Dec. 27, 1960 |